(12) United States Patent
Suzuki et al.

(10) Patent No.: US 8,273,444 B2
(45) Date of Patent: Sep. 25, 2012

(54) LAMP DESIGN SURFACE MEMBER AND METHOD OF MANUFACTURING LAMP DESIGN SURFACE MEMBER

(75) Inventors: Michihiko Suzuki, Shizuoka (JP); Akinori Yamamoto, Shizuoka (JP); Kenichi Matsunaga, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 73 days.

(21) Appl. No.: 12/853,424

(22) Filed: Aug. 10, 2010

(65) Prior Publication Data
US 2011/0052876 A1 Mar. 3, 2011

(30) Foreign Application Priority Data
Aug. 27, 2009 (JP) ................. 2009-196678

(51) Int. Cl.
*B60Q 3/00* (2006.01)
*B60Q 1/00* (2006.01)
(52) U.S. Cl. ......... 428/141; 362/362; 362/546; 362/507

(58) Field of Classification Search ................. None
See application file for complete search history.

(56) References Cited

U.S. PATENT DOCUMENTS
7,036,968 B2   5/2006 Michiba
2004/0057248 A1 *   3/2004 Michiba ................ 362/546

FOREIGN PATENT DOCUMENTS
JP   2003-317505 A   11/2003
JP   2004-103390 A   4/2004

* cited by examiner

*Primary Examiner* — David Sample
*Assistant Examiner* — Nicole Gugliotta
(74) *Attorney, Agent, or Firm* — Sughrue Mion, PLLC

(57) ABSTRACT

A lamp design surface member is provided. The lamp design surface member includes a design surface having a decorative surface. Concave-convex portions and planar portions are formed together on the decorative surface. The concave-convex portions have a peak cross-sectional height Rt of 1 μm or more and the planar portions have a peak cross-sectional height Rt smaller than 1 μm. The planar portions are formed so that an area ratio of the planar portions to the decorative surface is in a range of 30% to 80%.

4 Claims, 7 Drawing Sheets

FIG. 9

|  |  | Ra | Rt |
|---|---|---|---|
| EXAMPLE 1 | CONCAVE-CONVEX PORTIONS | 1279.8nm | 8158.0nm |
|  | PLANAR PORTION | 42.0nm | 243.0nm |
| EXAMPLE 2 | CONCAVE-CONVEX PORTIONS | 1728.9nm | 8838.3nm |
|  | PLANAR PORTION | 42.0nm | 243.0nm |
| COMPARATIVE EXAMPLE | CONCAVE-CONVEX PORTIONS | 1492.3nm | 9532.7nm |

FIG. 10

|  | EXAMPLE 1 | EXAMPLE 2 | COMPARATIVE EXAMPLE |
|---|---|---|---|
| POLISHING ON MOLD | PERFORMED | PERFORMED | NOT PERFORMED |
| AREA RATIO OF PLANAR PORTION | 75% | 38% | 0% |
| SENSORY EVALUATION OF UNEVENNESS IN APPEARANCE | O | O | X |

LAMP DESIGN SURFACE MEMBER AND METHOD OF MANUFACTURING LAMP DESIGN SURFACE MEMBER

This application claims priority from Japanese Patent Application No. 2009-196678, filed on Aug. 27, 2009, the entire contents of which are hereby incorporated by reference.

FIELD OF THE INVENTION

The present disclosure relates to a lamp design surface member and a method of manufacturing the lamp design surface member.

DESCRIPTION OF RELATED ART

For example, a vehicle headlight includes a design surface member such as an extension, which constitutes a design surface visible from an outside through an outer cover. Designability is also required for the design surface member. Accordingly, there is proposed a technique that forms an opaque painted surface so as to correspond to welding positions in order to conceal the welding positions when an inner member, such as a reflector, is welded to a design surface of a lamp body, or the like, subject to surface treatment (for example, see Japanese Patent Application Publication No. JP-A-2003-317505). Further, for example, there is proposed a vehicle lamp where cylindrical steps are formed on the inner surfaces of regions of a design surface along legs so as to provide an excellent appearance (for example, see Japanese Patent Application Publication No. JP-A-2004-103390).

Currently, in order to improve the designability of the design surface member, embossment including minute concavities and convexities is employed on the design surfaces of many design surface members. Concavities and convexities are formed by performing chemical treatment, such as etching, on a surface of a mold without concavities and convexities, and the embossment may be formed by molding a resin material using a mold. For example, when a design surface member is formed by using a crystalline resin material, it may be possible to form minute concavities and convexities having a depth of 1 μm or relatively coarse concavities and convexities having a depth of 100 μm because a transfer property is also high due to the high flow property of the crystalline resin material.

However, positions to which concavities and convexities smaller than the embossed concavities and convexities are to be transferred or are not to be transferred can be generated due to molding pressure or molding filling speed. This transfer variation is related to unevenness in appearance, such as gloss unevenness, and becomes one factor that makes appearance quality deteriorate. For example, a concave-convex surface formed by embossment, such as so-called pearskin-finishing, has often been employed as a lamp design surface member used in a vehicle lamp in order to represent a mineral effect. However, because embossment may cause the molding of the concavities and convexities to be non-uniform due to the method used, unevenness in appearance is apt to occur. To reduce the unevenness in appearance, there is known a method of reducing minute concavities and convexities by performing beading (blast processing) on an embossment forming surface of a mold. However, the unevenness in appearance has not been sufficiently reduced.

SUMMARY OF INVENTION

Illustrative aspects of the present invention provide a lamp design surface member with a reduced unevenness in appearance occurring when concave-convex portions are formed on a design surface of the lamp design surface member.

According to a first aspect of the invention, a lamp design surface member includes a design surface including a decorative surface on which concave-convex portions having a peak cross-sectional height Rt of 1 μm or more and planar portions having a peak cross-sectional height Rt smaller than 1 μm are formed, wherein the planar portions are formed so that an area ratio of the planar portions to the decorative surface is in a range of 30% to 80%.

According to a second aspect of the invention, a method of manufacturing a lamp design surface member, includes providing a mold including a decoration forming surface for forming a decorative surface, which has concavities and convexities, of the lamp design surface member; forming, on the decoration forming surface, concave-convex mold portions for forming concave-convex portions of the lamp design surface member; forming planar mold portions for forming planar portions of the lamp design surface member by polishing the concave-convex mold portions after forming the concave-convex portions; and forming the lamp design surface member by molding a molding material using the mold, and wherein the concave-convex portions have a peak cross-sectional height Rt of 1 μm or more, the planar portions has a peak cross-sectional height Rt smaller than 1 μm, and an area ratio of the planar portions to the decorative surface is in a range of 30% to 80%.

Other aspects and advantages of the invention will be apparent from the following description, the drawings and the claims.

BRIEF DESCRIPTION OF THE DRAWINGS

FIG. 9 is a view showing an arithmetic average roughness Ra and a peak cross-sectional height Rt of a decorative surface of each of Example 1, Example 2, and the Comparative example;

FIG. 10 is a view showing evaluation results of unevenness in the appearance of Example 1, Example 2, and the Comparative Example.

DETAILED DESCRIPTION OF EXEMPLARY EMBODIMENTS

An exemplary embodiment of the invention will be described in detail below with reference to drawings.

Figure 1:
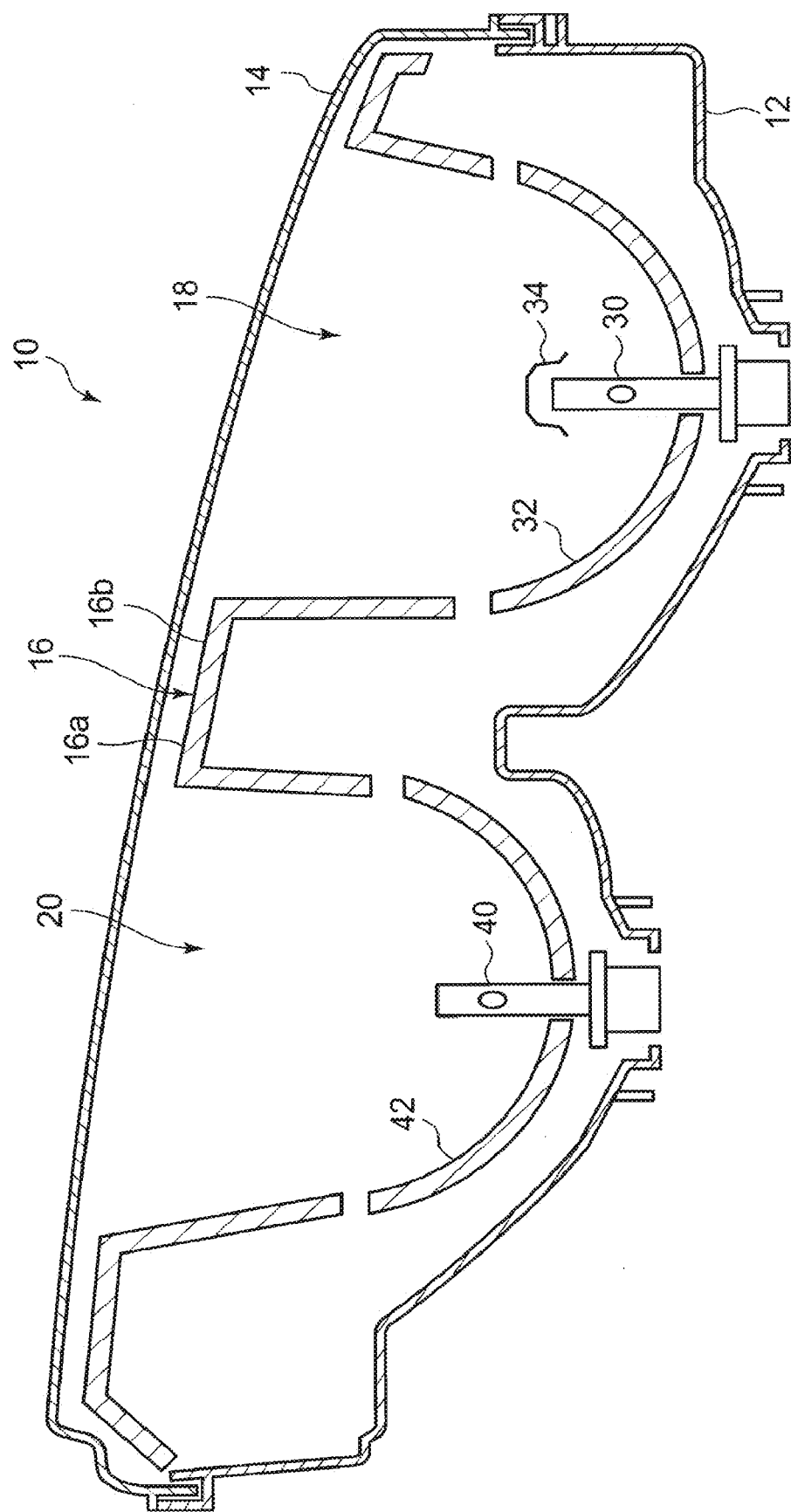
FIG. 1 is a cross-sectional view showing a vehicle headlight according to an exemplary embodiment.

FIG. 1 is a cross-sectional view showing a vehicle headlight 10 according to the exemplary embodiment. FIG. 1 shows the cross-section of the vehicle headlight 10, which is taken along a horizontal plane, as seen from an upper side. FIG. 1 shows the vehicle headlight 10 that is provided on a right side of a vehicle. A vehicle headlight provided on the left side of the vehicle is formed so as to be plane-symmetric with respect to the vehicle headlight 10 shown in FIG. 1.

The vehicle headlight 10 includes a lamp body 12, a translucent cover 14, an extension 16, a low-beam lamp unit 18, and a high-beam lamp unit 20. The lamp body 12 is made of a resin or the like, and is formed in a shape of a cup that has an elongated opening. The translucent cover 14 is made of a resin, or the like, having translucency, and is mounted on the lamp body 12 so as to close the opening of the lamp body 12. In this way, a lamp chamber is formed by the lamp body 12 and the translucent cover 14. The extension 16, the low-beam lamp unit 18, and the high-beam lamp unit 20 are disposed in the lamp chamber.

The extension 16 includes an opening through which light emitted from the low-beam lamp unit 18 and the high-beam lamp unit 20 passes, and is fixed to the lamp body 12.

The low-beam lamp unit 18 includes a reflector 32, a light source bulb 30, and a shade 34. The reflector 32 is formed in a shape of a cup, and an insertion hole is formed at a center of the reflector 32. In the exemplary embodiment, the light source bulb 30 is formed of an incandescent lamp such as a halogen lamp that includes a filament. Meanwhile, an electric-discharge lamp, which is formed of a HID lamp (referred to as a discharge lamp) such as a metal halide bulb, may be employed as the light source bulb 30. The light source bulb 30 is inserted into the insertion hole of the reflector 32 so as to protrude toward an inside of the lamp chamber and is fixed to the reflector 32. A curved surface is formed on an inner surface of the reflector 32 so that light emitted from the light source bulb 30 is reflected toward a front side of a vehicle. The shade 34 blocks light that directly travels toward the front side of the vehicle from the light source bulb 30.

The high-beam lamp unit 20 includes a light source bulb 40 and a reflector 42. The reflector 42 is formed in a shape of a cup, and an insertion hole is formed at a center of the reflector 42. The light source bulb 40 is also formed of an incandescent lamp. The light source bulb 40 is inserted into the insertion hole of the reflector 42 so as to protrude toward the inside of the lamp chamber and is fixed to the reflector 42. A curved surface is also formed on an inner surface of the reflector 42 so that light emitted from the light source bulb 40 is reflected toward the front side of the vehicle.

For example, the extension 16 and the like are formed so as to be visible from the outside through the translucent cover 14. For this reason, a portion of the extension 16, which is visible through the translucent cover 14, forms a design surface 16a. Accordingly, the extension 16 functions as a design surface member.

Therefore, designability or the like is required for a portion that is visible from the outside. For this reason, the design surface 16a of the extension 16 includes a decorative surface 16b on which embossment is formed. In the exemplary embodiment, the entire design surface 16a is formed of a decorative surface 16b. However, the decorative surface 16b may be formed at a part of the design surface 16a. Further, the extension 16 and the reflector 32 or the reflector 42 may be integrally formed. Further, a decorative surface on which embossment is formed may be formed on the reflector 32 or the reflector 42.

Figure 11:
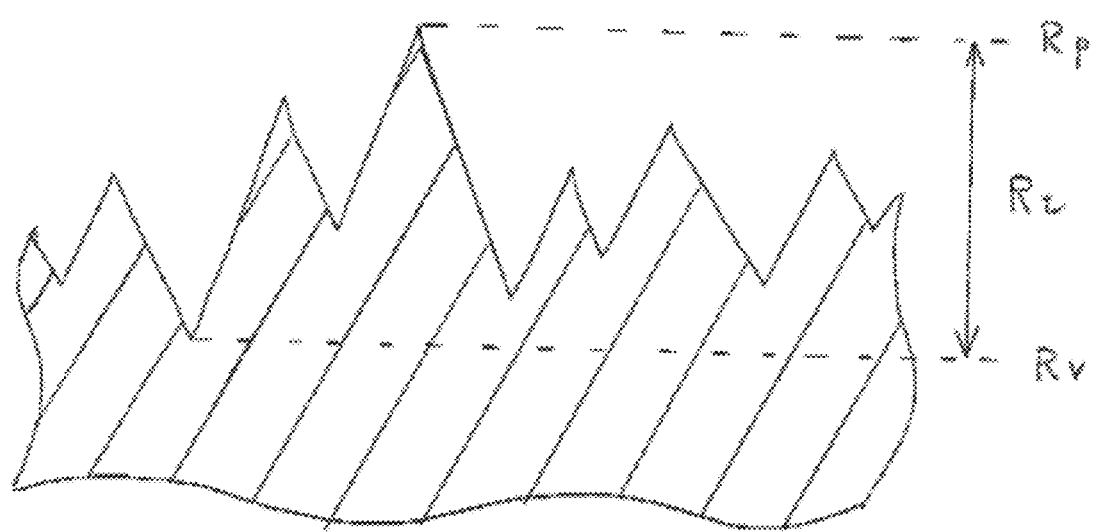
FIG. 11 is a view showing a height from the highest convex to a lowest concave.

In the exemplary embodiment, the decorative surface 16b is formed so that concave-convex portions having a peak cross-sectional height Rt of 1 µm or more and planar portions having a peak cross-sectional height Rt smaller than 1 µm exist together. The planar portions are formed so that an area ratio of the planar portions to the decorative surface 16b is in a range of 30% to 80%. The decorative surface 16b is formed by molding a molding material with a mold that includes a decoration forming surface for molding the decorative surface 16b. The decoration forming surface of the mold is formed so that concave-convex mold portions having a peak cross-sectional height Rt of 1 µm or more and planar mold portions having a peak cross-sectional height Rt smaller than 1 µm exist together and an area ratio of the planar mold portions to the decoration forming surface is in a range of 30% to 80%. As shown in FIG. 11, the peak-sectional height Rt is a height from the lowest convex Rv to the highest peak Rp.

As a result of diligent research and development by the inventor, it has been found that it may be possible to reduce visual unevenness in appearance through the existence of the concave-convex portions and the planar portions. Further, it has been found that it may be possible to further reduce visual unevenness in appearance by forming the planar portions of the decorative surface 16b so that the planar portions have a peak cross-sectional height Rt of 1 µm or less, preferably, 0.3 µm or less. Examples 1 and 2, which have planar portions formed on the decorative surface 16b according to the exemplary embodiment will be described below and will be compared with a Comparative example.

EXAMPLE 1

Figure 2:
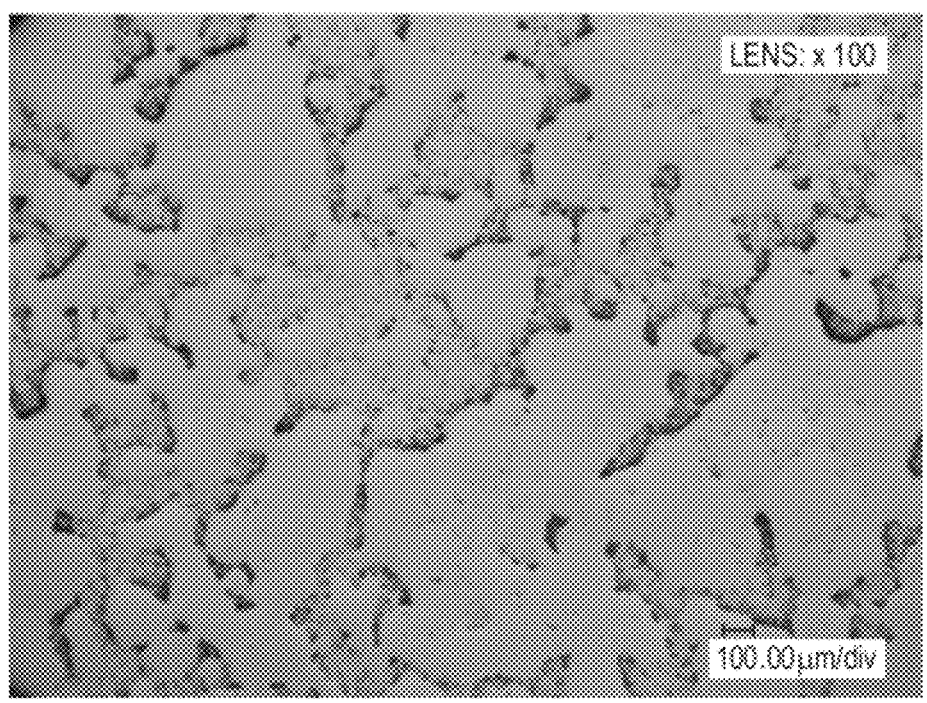
FIG. 2 is a surface photograph showing a decorative surface of a molding according to Example 1.

FIG. 2 is a surface photograph showing a decorative surface of a mold according to Example 1. In Example 1, a test material is formed by using a mold on which the decoration forming surface has been formed by forming pearskin-finished concave-convex portions on the mold, then flattening the concave-convex portions with sandpaper, and then performing polishing on the concave-convex portions. In Example 1, a test material was made using the same resin material as the material of the extension 16 but was formed in a shape different from the outer shape of the extension 16.

The concave-convex mold portions used to form the concave-convex portions of a molding and the planar mold portions used to form the planar portions of the molding are formed together on the decoration forming surface of the mold, which is used to mold the decorative surface of the molding of Example 1, so that the concave-convex portions and the planar portions are formed on the molded decorative surface as described above.

The concave-convex mold portions are formed so as to have a peak cross-sectional height Rt of 1 µm or more. Further, the planar mold portions are formed so as to have a peak cross-sectional height Rt of 0.3 µm or less. Meanwhile, the planar mold portions may be formed so as to have a peak cross-sectional height Rt smaller than 1 µm. The planar mold portions are formed so that an area ratio of the planar mold portions to the decoration forming surface is in the range of 30% to 80%.

In order to form a mold, pearskin-finished concave-convex portions having a peak cross-sectional height Rt of 1 µm or more were formed by, for example, etching on a surface (to be processed) of the mold, which forms the decoration forming surface. After that, the concave-convex portions were rubbed by sandpaper and upper ends of the convex portions of the concave-convex portions were flattened. Then, a part of the concave-convex portions were formed as the planar mold portions by performing polishing on the concave-convex portions. In this case, the rest of the concave-convex portions form concave-convex mold portions. It may be possible to easily form these planar portions by using polishing as described above. In Example 1, polishing was performed on the decoration forming surface of the mold by a compound with a roughness grade of #14000. A compound which includes diamond particles or alumina may be used as the compound.

As can be seen from FIG. 2, the decorative surfaces of the molding are formed using the mold so that dark convex portions and pale concave portions can be clearly confirmed visually when the decorative surfaces are magnified by a magnifier or an optical microscope. The convex portions of the molding are portions that are formed by the concave portions of the mold, and the concave portions of the molding are planar portions that are formed by the polished planar mold portions.

Figure 3:
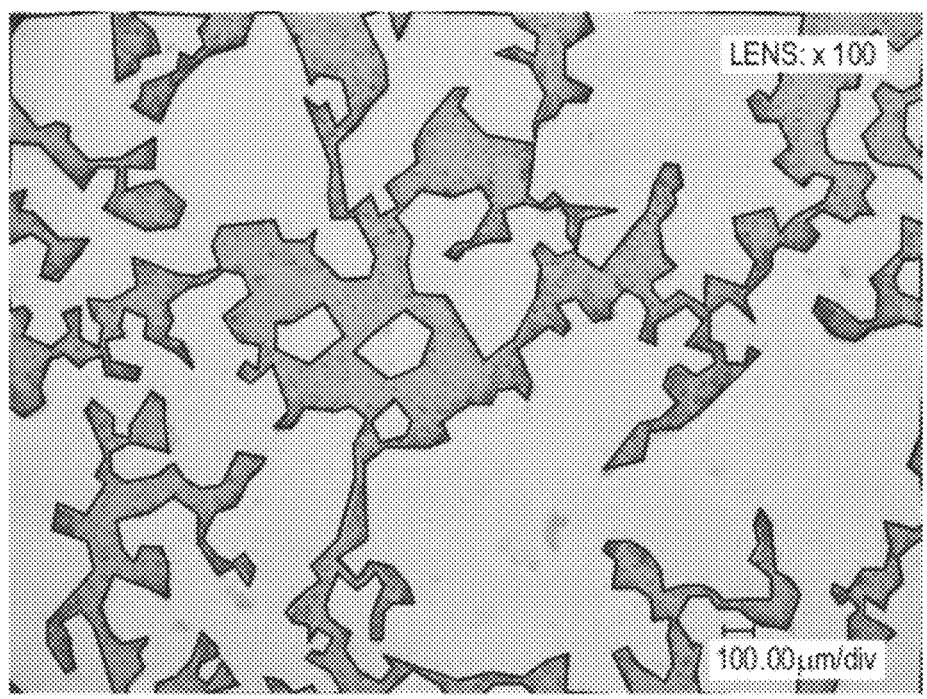
FIG. 3 is a view specifying planar portions of Example 1.

FIG. 3 is a view specifying the planar portions of Example 1. Because the planar portion is shown to be paler than the concave portion, it may be possible to easily specify the planar portion. For this reason, the inventor superimposes a layer on the image of FIG. 2 and surrounds outer borders of regions, which are specified as the planar portions, with lines by using well-known image software.

Figure 4:
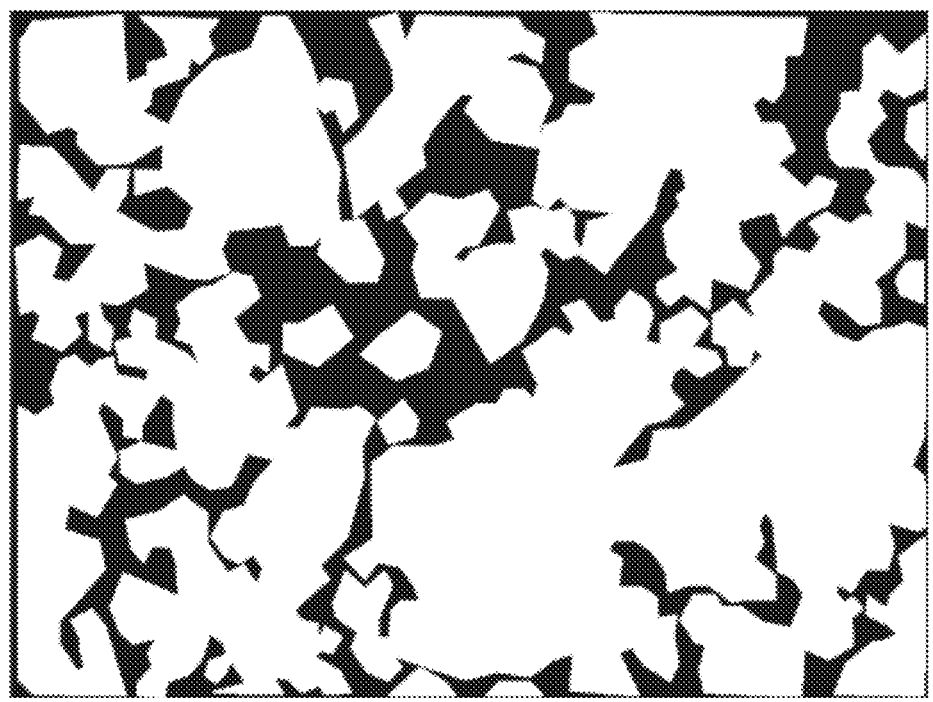
FIG. 4 is a view showing that planar portions and concave-convex portions of Example 1 are separated from each other.

FIG. 4 is a view showing that the planar portions and the concave-convex portions of Example 1 separated from each other. After that, the inventor took only superimposed layer out, set the color of the planar portion regions to white, and set the color of the other regions to black. The inventor calculated an area ratio between the entire region and the planar portions, i.e., the white regions, by using a function of the imaging software. A method, which obtains an area ratio by drawing the lines from the layer and applying a color to the layer by using the function of the image software, is well-known. Accordingly, description of the detailed procedure of the method will be omitted.

EXAMPLE 2

Figure 5:
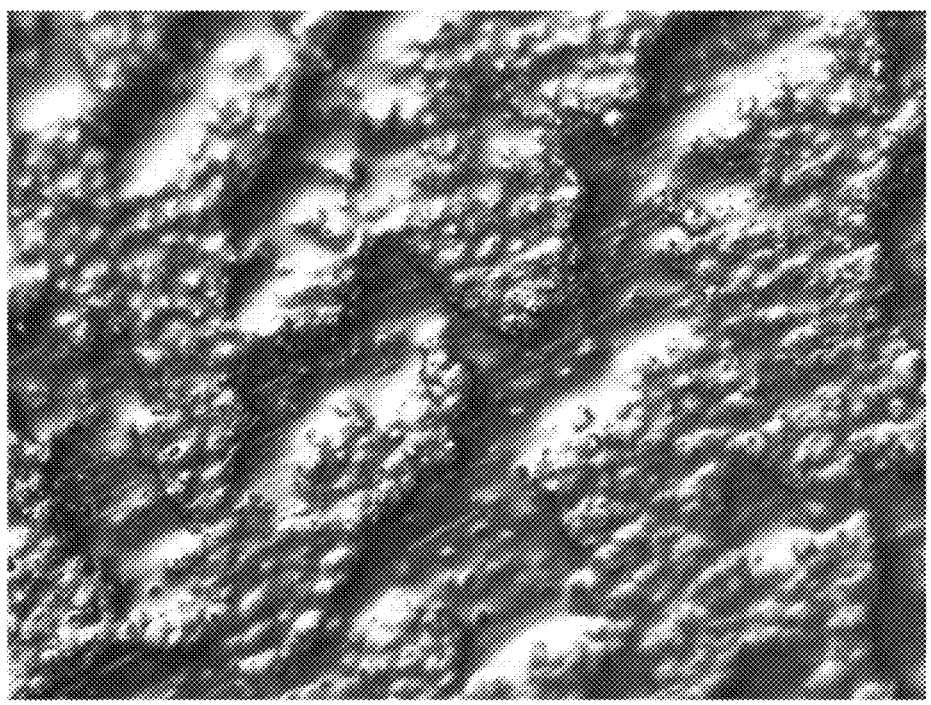
FIG. 5 is a surface photograph showing a decorative surface of a molding according to Example 2.

FIG. 5 is a surface photograph showing a decorative surface of a molding according to Example 2. In Example 2, a test material is formed using a mold on which the decoration forming surface has been formed by forming leather-like embossed concave-convex portions on the mold and performing polishing. In Example 2, evaluation was performed using a test material that was made of the same resin material as the material of the extension 16 but formed in a shape different from the outer shape of the extension 16.

The concave-convex mold portions used to form the concave-convex portions of a molding and the planar mold portions used to form the planar portions of the molding are also formed together on the decoration forming surface of the mold, which is used to mold the decorative surface of the molding of Example 2 so that the concave-convex portions and the planar portions are formed on the molded decorative surface as described above.

Example 2 is the same as Example 1 in regard to the points that the concave-convex mold portions are formed so as to have a peak cross-sectional height Rt of 1 μm or more, and the planar mold portions are formed so as to have a peak cross-sectional height Rt of 0.3 μm or less, or the planar mold portions are formed so that an area ratio of the mold planar portions to the decoration forming surface is in the range of 30% to 80%.

In order to manufacture a mold, leather-like embossed concave-convex portions having a peak cross-sectional height Rt of 1 μm or more were formed on a surface (to be processed) of the mold, which forms the decoration forming surface, by, for example, etching. After that, the planar mold portions were formed by performing the same polishing as described above. In Example 2, a test material was also made of the same resin material as the material of the extension 16 but was formed in a shape different from the outer shape of the extension 16.

As can be seen from FIG. 5, the decorative surfaces of the molding are formed using the mold so that pale convex portions and dark concave portions can be clearly confirmed visually. The convex portions of the molding are portions that are formed by the concave portions of the mold, and the concave portions of the molding are planar portions that are formed by the polished mold planar portions.

Figure 6:
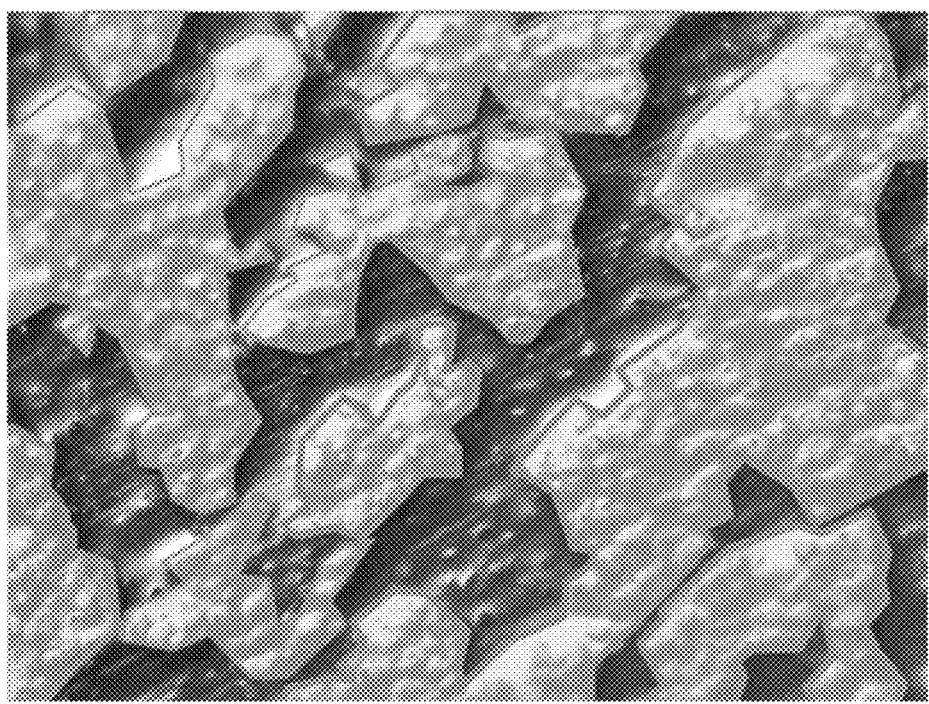
FIG. 6 is a view specifying planar portions of Example 2.

FIG. 6 is a view specifying planar portions of Example 2. The inventor superimposed a layer on the image of FIG. 5 and surrounded the outer borders of regions, which are specified as the planar portions, with lines by using well-known image software in the same manner as described above.

Figure 7:
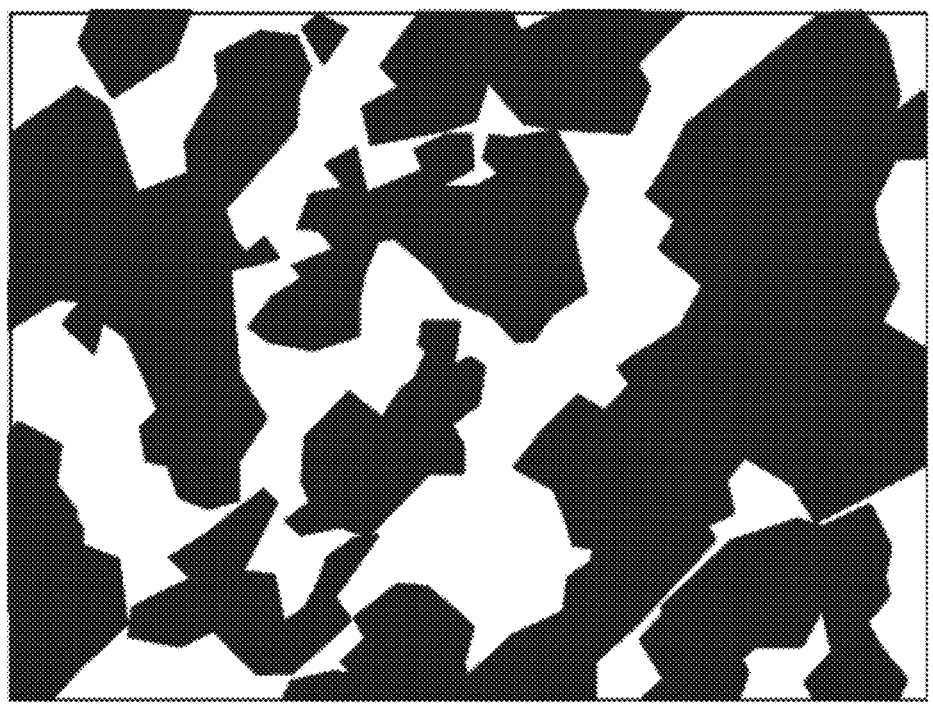
FIG. 7 is a view showing that planar portions and concave-convex portions of Example 2 are separated from each other.

FIG. 7 is a view showing that the planar portions and the concave-convex portions of Example 2 are separated from each other. After that, the inventor took only superimposed layer out, set the color of the planar portion regions to white, and set the color of the other regions to black in the same manner as described above. In addition, the inventor calculated an area ratio between the entire region and the planar portions by using a function of the image software.

COMPARATIVE EXAMPLE

Figure 8:
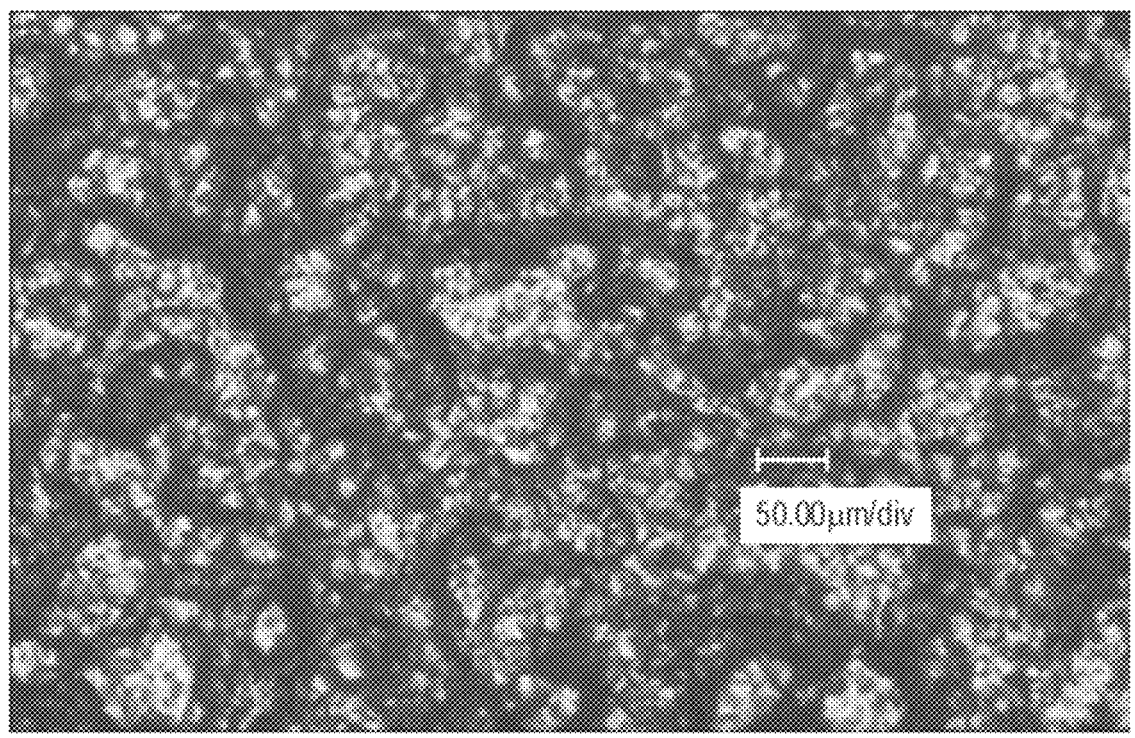
FIG. 8 is a surface photograph showing a decorative surface of a molding according to a Comparative example.

FIG. 8 is a surface photograph showing a decorative surface of a molding according to a Comparative example. A decorative surface according to the Comparative example is a so-called pearskin-finished surface. In the Comparative example, a resin material is molded by using a mold on which pearskin-finished concave-convex portions have been formed, and pearskin-finished concave-convex portions, which have a peak cross-sectional height Rt of 1 μm or more, are formed on the surface of a test material. Even in the Comparative example, a test material was made of the same resin material as the material of the extension 16 but was formed in a shape different from the outer shape of the extension 16. As can be seen from FIG. 8, there is no polishing mark on the surface of the decorative surface and the surface is formed of only the concave-convex portions.

FIG. 9 is a view showing the arithmetic average roughness Ra and the peak cross-sectional height Rt of the decorative surface of each of Example 1, Example 2, and the Comparative example. As for Examples 1 and 2, it is difficult to completely calculate the arithmetic average roughness Ra and the peak cross-sectional height Rt of the concave-convex portions and the planar portions separately. For this reason, the arithmetic average roughness Ra and the peak cross-sectional height Rt of the concave-convex portions including the planar portions were measured and calculated first. Accordingly, the arithmetic average roughness Ra and the peak cross-sectional height Rt of the decorative surface shown in FIG. 2 were measured and calculated for Example 1, and the arithmetic average roughness Ra and the peak cross-sectional height Rt of the decorative surface shown in FIG. 5 were measured and calculated for Example 2.

Further, the area of one of each of the planar portions of Example 1 shown in FIG. 2 and the planar portions of Example 2 shown in FIG. 5 is very small. For this reason, in order to more accurately calculate the arithmetic average roughness Ra and the peak cross-sectional height Rt, for the planar portions of Examples 1 and 2, polishing was performed on a flat surface (to be processed) of a mold on which pearskin-finished or leather-like embossed concavities and convexities were not formed and a test material was molded by this mold. A test material, which was made of the same material as the material of the extension 16, was used in this case. Further, the above-mentioned compound with the roughness grade of #14000 was used for polishing. The arithmetic average roughness Ra and the peak cross-sectional height Rt of the test material, which was formed in this way, were measured and calculated.

As described above, in Examples 1 and 2, it is found that the arithmetic average roughness Ra of the concave-convex portions is 1 pm or more, the peak cross-sectional height Rt of the concave-convex portions thereof is 8 μm or more, the arithmetic average roughness Ra of the planar portions is 0.05 μm or less, and the peak cross-sectional height Rt is 0.3 μm or less. Further, in the Comparative example, it is found that the arithmetic average roughness Ra of the concave-convex portions is 1 μm or more and the peak cross-sectional height Rt of the concave-convex portions is 9 μm or more.

FIG. 10 is a view showing evaluation results of unevenness in the appearance of Example 1, Example 2, and the Comparative example. In Examples 1 and 2, where the polishing of the mold was performed, based on the results of visual evaluation, unevenness in appearance was in an allowable range. In contrast, in the Comparative example, unevenness in appearance was not in an allowable range.

From this result, concave-convex portions having a peak cross-sectional height Rt of 1 μm or more and planar portions having a peak cross-sectional height Rt of 0.3 μm or less are formed together on the decorative surface, and the planar portions are formed in this case so that an area ratio of the planar portions to the decorative surface 16b is in the range of 30% to 80%, so that it may be possible to suppress unevenness in the appearance.

The invention is not limited to the above-mentioned exemplary embodiment, and appropriate combinations of the respective components of this exemplary embodiment are also effective as exemplary embodiments of the invention. Further, modifications such as various design changes may be added to this exemplary embodiment on the basis of the knowledge of those skilled in the art, and an exemplary embodiment to which the modifications are added is also included in the range of the invention. An example of the modifications will be described below.

In one modification, concave-convex mold portions are formed by etching the surface (to be processed) after dispersedly masking the surface (to be processed) so that an area ratio of planar portions to a surface (to be processed), which forms the decoration forming surface of a mold, is in the range of 30% to 80%. Then, mold planar portions are formed by removing the masking. Accordingly, concave-convex mold portions used to form the concave-convex portions and the planar mold portions used to form the planar portions are formed so that the concave-convex portions having a peak cross-sectional height Rt of 1 μm or more and the planar portions having a peak cross-sectional height Rt smaller than 1 μm are formed together on the formed decorative surface and an area ratio of the planar portions to the decorative surface is in the range of 30% to 80%. It may be possible to easily adjust an area ratio of the planar portions of a molding by using simple methods, such as masking and etching. Accordingly, it may be possible to easily suppress unevenness in appearance.

Further, in the above-mentioned exemplary embodiment, the extension has been exemplified as a lamp design surface member. However, the invention is not limited thereto and may also be applied to a housing. Furthermore, in the above-mentioned exemplary embodiment, there has been exemplified a vehicle headlight corresponding to a so-called four-lamp type where a low-beam lamp unit and a high-beam lamp unit are separately formed. However, the invention is not limited thereto and may also be applied to a vehicle headlight corresponding to a so-called two-lamp type where a low-beam lamp unit also functions as a high-beam lamp unit.

What is claimed is:

1. A lamp design surface member comprising:
a design surface including
a decorative surface on which concave-convex portions having a peak cross-sectional height Rt from a highest convex to a lowest concave of 1 μm or more and planar portions having a peak cross-sectional height Rt from a highest convex to a lowest concave smaller than 1 μm are formed,
wherein the planar portions are formed so that an area ratio of the planar portions to the decorative surface is in a range of 30% to 80%.

2. The lamp design surface member according to claim 1, wherein the planar portions have a peak cross-sectional height Rt of 0.3 μm or less.

3. The lamp design surface member according to claim 1, wherein the decorative surface is formed by molding a molding material using a mold,
wherein the mold includes a decoration forming surface, which forms the decorative surface,
wherein the decoration forming surface includes planar mold portions, which form the planar portions and concave-convex mold portions, which form the concave-convex portions, and
wherein the planar mold portions are formed by performing polishing on the concave-convex mold portions after forming the concave-convex mold portions.

4. The lamp design surface member according to claim 2, wherein the decorative surface is formed by molding a molding material using a mold,
wherein the mold includes a decoration forming surface, which forms the decorative surface,
wherein the decoration forming surface includes planar mold portions, which form the planar portions and concave-convex mold portions, which form the concave-convex portions, and
wherein the planar mold portions are formed by performing polishing on the concave-convex mold portions after forming the concave-convex mold portions.

* * * * *